SUPERCONDUCTIVE TRANSMISSION LINE MEMORY UTILIZING REFLECTRONS

Filed Sept. 7, 1961 2 Sheets-Sheet 1

INVENTORS
MARVIN J. FREISER
JAMES C. SWIHART

BY John E. Dougherty Jr.
ATTORNEY 3,114,895

SUPERCONDUCTIVE TRANSMISSION LINE MEMORY UTILIZING REFLECTRONS

Marvin J. Freiser, Chappaqua, and James C. Swihart, Peekskill, N.Y., assignors to International Business Machines Corporation, New York, N.Y., a corporation of New York Filed Sept. 7, 1961, Ser. No. 136,477
15 Claims. (Cl. 340—173.1)

The present invention relates to superconductive memory circuits and more particularly to a high speed superconductive memory in which a plurality of information is selectively stored directly in a superconductive transmission line and the line is interrogated for the information thus stored in a single operation by an interrogation signal applied directly to the transmission line.

Superconductive circuits of the prior art have been constructed both in wire wound form and in thin film form and circuits of the latter type have been fabricated as transmission lines in order to achieve high operating speeds. In the great majority of the circuits of the prior art, storage is accomplished either in persistent current loops or in parallel path flip-flop type circuits. Required functional operations are accomplished under the control of cryotron control conductors which are energized to cause associated gate conductors to assume a resistive state. The state of the gate conductors is determined at all times by the current in the associated control conductor. In storage circuits of this type, the control and gate conductors are connected in parallel path circuits and writing and reading operations are carried out by selectively switching the supply current between these paths. Further, gate conductors controlled in this way by the presence or absence of current in an associated control conductor have been connected in a superconductive transmission line and the line interrogated to read out one bit at a time by applying a pulse to the line and observing the time at which the first reflection is produced in response to the applied pulse.

Storage has been also accomplished in superconductive gate conductors using a heat latching principle. For this mode of operation, the gate conductor continuously receives a D.C. bias current and is switched back and forth between superconducting and resistive states by signals applied either to the gate conductor itself or to the control conductor for the gate conductor. The gate conductor, once switched, remains in the state into which it has been switched after the applied switching signals have been terminated. Though such storage devices have been considered to offer some advantages, they have not been used extensively in memory arrays including a large group of storage devices with appropriate addressing circuitry for reading and writing.

Prior art on devices such as those discussed above is found in the following applications and publication:

(1) U.S. Patent No. 2,832,897, issued April 29, 1958, to D. A. Buck;

(2) Copending application Serial No. 615,814, filed on October 15, 1956, in behalf of R. L. Garwin;

(3) Copending application Serial No. 625,512, now Pat. #2,881,586, filed on November 30, 1956, in behalf of R. L. Garwin;

(4) U.S. Patent No. 2,962,681, issued November 29, 1960, to J. J. Lentz;

(5) Copending application Serial No. 79,824, filed on December 30, 1960, in behalf of J. L. Anderson;

(6) "A New Type of Bistable Element Involving Thermal Propagation of a Normal Region in a Thin Superconducting Film," by R. F. Broom et al., Office of Naval Research Symposium Report, ACR–50, pp. 113–120.

Though as is evident by the art cited above, great strides have been made both in simplifying the structure of cryotron storage devices and in increasing the speed of operation of such devices, the extremely high speeds attainable by using to the utmost the inherent capabilities of superconductive transmission lines have not been realized.

In accordance with the principles of the present invention, there is provided a superconductive memory transmission line system in which a plurality of information bits are stored and which can be interrogated completely at extremely high speeds. In one embodiment of the invention disclosed herein by way of illustrating the inventive principle, a superconductive transmission line is formed by a strip of superconducting material laid down above a superconducting shield. The superconducting strip is provided with a number of superconducting gate sections each of which has associated with it a control conductor for controlling switching of the gate between superconducting and resistive states. A bias current is continuously applied to the transmission line and this current has a magnitude such that when any one of the gates is driven into a resistive state by a pulse applied to the associated control conductor alone, or coincident pulses applied both to the control conductor and transmission line itself, the gate is maintained resistive by the bias current in the line after termination of the switching signal(s). Information is stored by selectively driving different ones of the gate conductors in the line into a resistive state to thereby write in the line a plurality of information bits which may form all or part of an information word. The information stored in all of the gate sections of the entire line is interrogated by applying to the line a signal which propagates through the gate sections in sequence. As the applied interrogation signal passes through each of the resistive gate sections, a reflection is produced. By proper design of the characteristic impedance of the transmission and the resistance of the gate sections, only a small portion of energy of the incident interrogation signal is reflected at each of the resistive gate sections. As a result, even though the interrogation signal applied to the line is diminished somewhat as it passes through each resistive gate, the reflections which are produced at the successive gates are essentially of the same magnitude and the series of reflections produced by the interrogation signal as it propagates down the line can be sensed without difficulty to provide a serial indication of the plurality of bits stored in the line. Further, since only a small portion of the energy of a pulse propagating in the line is reflected at each resistive gate conductor, multiple reflections between the gate conductors present no serious noise problem since the magnitude of such reflections when they reach the output circuitry is so low as to be insignificant. Since the entire readout operation is accomplished by the application of a single interrogation signal, it is obvious that the time required for the readout operation is the time required for the interrogation pulse to pass from one end of the transmission line to the last gate conductor in the line and the time required for the reflection for that last gate conductor to propagate back to the output sensing circuitry. Thus, an entire line including a plurality of bits can be interrogated in times less than 100 millimicroseconds.

Therefore, it is an object of the present invention to provide improved high speed superconducting memory circuits using a superconductive transmission line.

It is a further object to provide an improved high speed superconducting memory circuit including a superconducting transmission line, wherein a plurality of bits stored in the transmission line itself can be reproduced during an interrogation operation in response to a single signal applied to the transmission line.

Still another object is to provide an improved high speed transmission line memory in which writing can be accomplished under the coincident control of signals applied to the control conductors arranged adjacent gate sections of the transmission line and signals applied directly to the line and, further, such a memory in which information stored in various sections of the line is reproduced during an interrogation by reflections produced by an interrogation signal applied to the line.

Still another object of the invention is to provide an improved superconductive transmission line memory including a plurality of sections in which information is written and erased by selectively introducing and removing resistance, wherein those sections into which resistance is introduced are maintained resistive by a bias current continuously applied to the transmission line and the states of all sections are determined in a single interrogation operation.

Another object is to produce a transmission line memory structure of the above described type wherein the gate sections are part of a single homogeneous strip of superconductive material.

A further object is to provide transmission line structure of the above described type wherein the series of information representing reflected signals produced during an interrogation operation are signals of essentially the same magnitude and, further, wherein signals produced by multiple reflections between resistive gate sections are of a much smaller magnitude.

Still another object of the present invention is to provide a superconductive transmission line memory of the above described type wherein the relationship between the resistance of the gate conductor sections and the impedance of the transmission line is such that the reflections produced by a signal propagating through any one of the gate conductors in a resistive state has a magnitude very much smaller than that of the propagating signal, thereby allowing making it possible to interrogate a number of gate conductors in such a line during a single readout operation.

The foregoing and other objects, features and advantages of the invention will be apparent from the following more particular description of preferred embodiments of the invention, as illustrated in the accompanying drawings.

Figure 1:
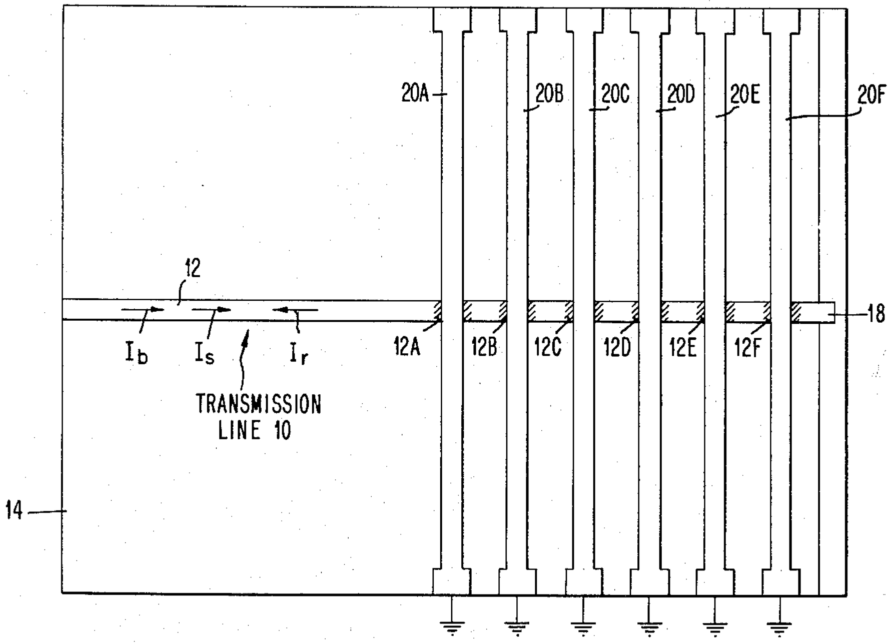
FIG. 1 is a schematic representation of a superconductive transmission line memory constructed in accordance with the principles of the present invention.

Referring now to the drawings in detail, FIG. 1 shows a transmission line memory structure 10 in which information is stored and which is interrogated by signals applied to the transmission line. More particularly, the transmission line 10 is formed by a planar superconductive conductor 12 laid down on a superconductive shield 14. The conductor 12 and shield 14 are separated by a thin film of insulating material which forms the dielectric for the transmission line but which is not shown in the drawing. The conductor 12 is provided with six gate conductor sections designated 12A, 12B, 12C, 12D, 12E and 12F and it is in these gate conductor sections of the transmission line that information is stored. These gate conductor sections are controlled between superconducting and resistive states by current applied to six corresponding control conductors 20A, 20B, 20C, 20D, 20E and 20F. The gate conductor sections are fabricated of a soft superconductive material such as tin and the remainder of the transmission line and the control conductors are fabricated of a hard superconductive material.

The transmission line 10 is supplied with a bias current $I_b$, graphically indicated, which continuously flows in the line. Interrogation signals represented by the arrows $I_s$ are applied to this line to interrogate the state of the gate conductors 12A, 12B, 12C, 12D, 12E and 12F. Each of these gate conductors which is in a resistive state provides a discontinuity in the transmission line. As the interrogation signal passes through the transmission line, it provides a reflection at each such discontinuity provided by a resistive gate conductor. Each such reflection is transmitted back through the line, as indicated by the arrow $I_r$, and applied to appropriate output circuitry. The time at which reflected pulses are produced by the output circuitry provides an indication of the gate sections 12A through 12F which are in a superconducting state and those which are in a resistive state. The transmission line 10 is terminated at 18 in its characteristic impedance so that reflections are not transmitted back from the end of the line.

In the discussion to follow, the manner in which information is stored in the gates 12A through 12F is first explained with reference to FIGS. 1, 2A and 2B; then the circuitry for controlling the storage of information in these gates is explained with particular reference to FIGS. 3A and 3B; and finally the circuitry for interrogating the information stored is considered in detail with particular reference to FIGS. 4A and 4B.

Figure 2A:
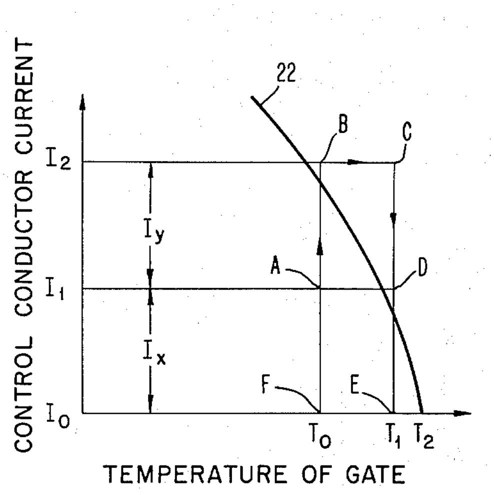
FIGS. 2A and 2B are curves depicting the operating characteristics for gate conductor sections connected in the transmission line memory of FIG. 1.

The manner in which the information is stored in the gate conductor sections 12A through 12F can be best understood by a consideration of FIG. 2A. In this figure, the current through the control conductor, such as, for example, control conductor 20A in FIG. 1, is plotted against the temperature of the associated gate conductor 12A. The curve 22 in FIG. 2A defines the transition between superconducting and normal states for the gate conductor 12A. The gate conductor is superconducting for loci below and to the left of the curve and is resistive for loci above and to the right of the curve.

The characteristic curve 22 of FIG. 2A is for a predetermined bias current $I_b$ flowing in the transmission line and, therefore, through the gate conductors 12A through 12F. As will be explained in detail later, the operation of the device varies in accordance with the magnitude of this biasing current. The temperature $T_0$ represented at point F in FIG. 2A is the operating temperature of the superconductive environment for the device. Assuming that the gate conductor sections 12A through 12F are fabricated of tin and the remaining superconductive portions of the device of lead, the temperature would be in the vicinity of 3.7° K., that is below the transition temperature for tin in the absence of a magnetic field. The point F represents the state of the gate conductor 12A at this operating temperature in the absence of current in conductor 20A.

If the current in the control conductor is increased from this zero value at $I_0$ to a value at $I_1$ by the application to the control conductor of a current signal, which is termed $I_x$, the operating point is changed from point F to point A and the gate remains superconducting. If, however, the control conductor current is increased by the further application of a current signal, which is designated $I_y$, the operating point is at B in FIG. 2A. At this point, the gate conductor section 12A is in a resistive state. When resistance is introduced into the gate conductor by increasing the total current in control conductor 20A, the bias current $I_b$ flowing in the gate conductor 12A produces $I^2R$ heating in the gate conductor thereby increasing the temperature of the gate conductor to a temperature $T_1$ and the operating point is shifted to point C. The amount of temperature rise is determined by the magnitude of the bias current $I_b$, the resistance of the gate section 12A, and the rate at which heat is dissipated into the superconductive helium environment.

As long as the total control conductor current remains at the value $I_2$, the operating point for the gate conductor section 12A is at point C and the gate is at a temperature $T_1$. At this elevated temperature, the magnitude of the field which must be applied to the gate in the presence of the bias current $I_b$ to maintain the gate resistive is less than the field required when the gate is at a temperature $T_0$. Therefore, when the current $I_y$ is removed to reduce the total current in conductor 20A to the value $I_1$, the operating point at D is reached, at which point the gate is in a resistive state. The gate remains in this state as long as the bias current $I_b$ continues to flow in the transmission line 10 and current $I_x$ is applied to the control conductor 20A. When the gate is at point D, with control conductor 20A carrying energizing current $I_1$, the transmission line 10 carrying bias current $I_b$, and the temperature of the gate at $T_1$, a binary one is stored. At the operating temperature $T_0$, for the same current in the control conductor and transmission line, the gate 12A is in a superconducting state at point A, which is the binary zero state for the gate.

When the gate conductor 12A is storing a binary one at point D, this binary one value may be erased by interrupting the bias current $I_b$ to discontinue the $I^2R$ heating of the gate and enable it to return to the operating temperature $T_0$. As the bias current $I_b$ is reapplied, the gate remains superconducting and the operating point is at the binary zero state A. The binary one may also be erased by reducing the total current in the control conductor 20 to the value $I_0$. This is accomplished by either reducing the applied current $I_x$ or applying to the control conductor a current of equal magnitude in the opposite direction. In such a case, the operation is depicted by the line DE. This line, as is shown in the drawing, crosses the transition curve 22 at which time the gate conductor 12A becomes superconducting. Thus the $I^2R$ heating is discontinued and the gate reverts from point E to the lower operating temperature at point F. Upon reapplication of the current $I_x$ or removal of the opposing current applied to the control conductor 20A, the binary zero state at point A is attained.

Figure 2B:
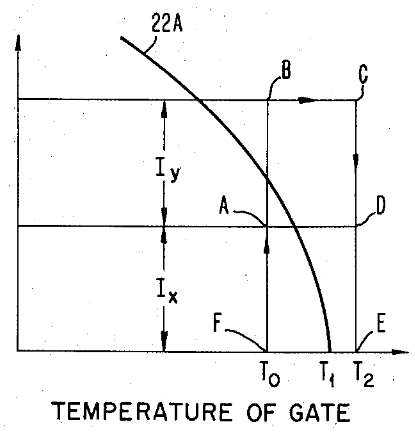
Figures 3A, 3B:
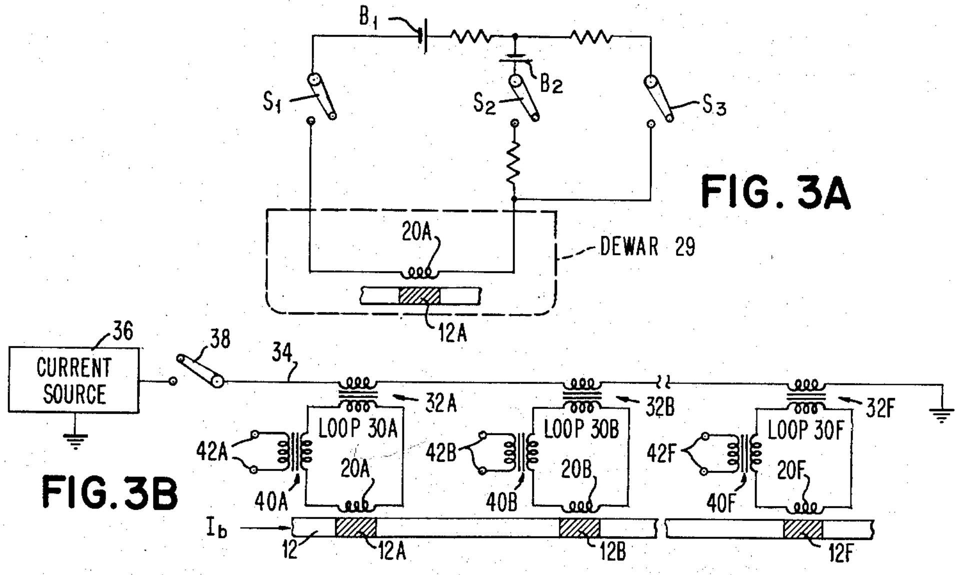
FIGS. 3A and 3B are circuit diagrams of input circuits for controlling writing operations in the superconductive transmission line memory of FIG. 1.

The manner in which the signals are applied to the control conductors 20A through 20F to store binary ones and binary zeros in the gate conductors 12A through 12F is illustrated in FIGS. 3A and 3B. In FIG. 3A only one gate conductor section 12A is shown together with a control conductor section 20A which, for illustrative purposes, is graphically shown as a control conductor coil. The dotted block 29 represents a helium dewar or other refrigeration apparatus which maintains the structure at the proper superconductive temperature. The application of the current depicted at $I_x$ in FIG. 2 is accomplished by simultaneously closing the switches $S_1$ and $S_3$ to enable battery $B_1$ to provide the current $I_x$ to control conductor 20A. The device is then in the binary zero state at point A. When it is desired to store a binary one in the gate 12A, switch $S_2$ is closed and switch $S_3$ is opened. The battery $B_2$, then applies a current $I_y$ in addition to the current $I_x$ supplied by battery $B_1$ to the control conductor 20A. When the control conductor has been energized with this current, that is a net current $I_2$ in FIG. 2, the gate conductor 12A is driven into a resistive state at point B. Due to the bias current in the transmission line, the gate is heated to the temperature $T_1$ at operating point C. When switch $S_3$ is subsequently closed and switch $S_2$ is opened so that current in the control conductor is reduced to the value $I_1$, the binary one state at D is attained in which state the gate conductor section 12A is resistive. It should be noted that the current in the control conductor is the same for the quiescent binary one and binary zero states at points A and D, and binary values are stored in the conductor 12 itself which is part of the transmission line 10 and not in the control conductor 20A adjacent the transmission line.

When it is desired to erase the binary one and write a binary zero in the gate section 12A, it is only necessary to open switch $S_3$ to momentarily reduce the net current in the control conductor to zero and thereby allow the gate to revert from point D in FIG. 2A to point E and thence to point F as the $I^2R$ heating is terminated. When switch $S_3$ is closed again to apply the current $I_x$, the gate is returned to the binary zero state at point A, in which state it is superconducting.

In the embodiment of FIG. 3B, the circuitry controlling the application of current to the control conductors 20A through 20F is superconducting. In this embodiment, each of the control conductors 20A through 20F is connected in a superconducting loop 30A through 30F. Each of these loops is coupled to a biasing control line 34 by transformer coupling illustrated at 32A through 32F. This line 34 receives a current from a current source 36 under the control of a switch illustrated at 38. When switch 38 is closed and a D.C. current is flowing in the line 34, due to the superconducting properties of the closed loops 30A through 30F, a continuous current $I_x$ is induced in each of these loops. The transformers 32A through 32F operate as D.C. transformers to produce D.C. current $I_x$ in the loops 30A through 30F in response to the current in the line 34. Each of the loops is also provided with an input transformer 40A through 40F through which input signals are applied to the loops. Considering loop 30A with a current flowing on line 34 and thus a loop current $I_x$ flowing through the conductor control 20A, the application of a signal, here considered to be positive, to the terminals 42A of transformer 40A induces current in loop 30A equal to the value $I_y$ indicated in FIG. 2A. This current is in the same direction as the current $I_x$ and therefore the total loop current and the current in the control conductor 20A is increased to the value $I_2$ in FIG. 2A. Gate conductor section 12A is thus driven resistive and is heated by the current $I_b$ flowing in the transmission line of which conductor 12 is a part. Upon termination of the signal applied to the terminals 42A, the current in the loop is reduced to the value $I_1$, which is the $I_x$ current supplied through transformer 32A. However, due to the heating latching of the gate conductor 12A this gate remains in a binary one state at point D in FIG. 2A.

In a similar manner, binary one's may be written in each or any of the other loops 30B through 30F. If it is desired to erase the information written in all of the loops at one time, it is only necessary to open switch 38 and thereby decrease the loop current to zero so that gates which are in a resistive state become superconducting thereby discontinuing $I^2R$ heating. When switch 38 is again closed to energize line 34 and apply currents $I_x$ to each of the loops, the gates assume the binary zero state at point A.

Information written in any one of the gates 12A can be individually erased by applying a signal of negative polarity to the terminals of the input transformer. For example, considering gate 12A to be storing a binary one at point D and the loop 30A to be carrying a current $I_x$ applied through transformer 32A, the application of a negative current signal to terminals 42A reduces the net current in the loop to essentially zero. As a result, an excursion occurs along the line DE in FIG. 2A allowing the gate 12A to become superconducting. With the gate superconducting there is no more $I^2R$ heating and the gate loop returns to the operating temperature $T_0$ at point F. Upon the termination of the negative signal applied to the terminal 42A, an excursion along the line FA is produced as the gate assumes the binary zero superconducting state at point A.

It should be noted that in the operation above described, the information is stored in the gate itself and not in the loops 30A and 30F in which the control conductors 20A through 20F are connected. These loops and the control conductors connected therein are used to change the state of the gates that is to either write a binary one or a binary zero in the gate. The loops carry a current $I_x$ applied by the line 34 when the gates are in their quiescent states storing either a binary one or a binary zero. Further, writing can be accomplished in any one of the gates individually or in all of the gates at one time, and the gates may be erased, that is set to the binary zero state, either all at once by opening switch 38, or individually or in groups by selectively applying negative signals to the inputs 42A through 42F of the input transformers 40A through 40F.

The superconductive transmission line 10 in which information is stored in the gate sections 12A through 12F may be also operated in a mode such that when in a quiescent state storing either a binary one or a binary zero, there is no current in the conductors 20A through 20F. This mode of operation may be achieved by increasing the bias current $I_b$ applied to the transmission line to provide a transition curve such as the curve 22A shown in FIG. 2B. In this figure, the same reference characters as are used in FIG. 2A designate the various operating points. The operating temperature is $T_0$ and initially all of the gates are in the superconducting state represented at point F which is here the binary zero state. Considering again the input circuit represented in FIG. 3B, if either transformer 32A or 40A for loop 30A is energized to induce a current in the loop 30A, the current in the loop is increased only to the value $I_1$ in FIG. 2B and, upon termination of the input signal applied to either transformer, the device reverts to its binary zero state at point F. However, if both of these transformers are simultaneously energized, an excursion is produced from the point F to point B as the current in loop 30A is increased to the value $I_2$. At point B gate 12A is resistive, $I^2R$ heating is produced to increase the gate temperature to $T_1$ and, with the current continuing to flow in the loop, the operating point is at point C. A somewhat larger increase in temperature when the gate is driven resistive is here achieved due to the larger bias current $I_b$ flowing in the transmission line 10. Further, due to this larger bias current, the temperature $T_2$ at which the gate remains resistive in the absence of any control conductor current is lower than that shown in FIG. 2A. Upon removal of the inputs to the transformer 40A and 32A, the current in the loop is reduced to zero and the operating point is at point E. Gate 12A remains resistive and stores a binary one.

With this mode of operation it is necessary, if the binary one is to be erased, to interrupt the bias current $I_b$ in the transmission line 10 to allow the gate to cool down from the temperature $T_1$ at point E to the operating temperature $T_0$, and become superconducting. Upon reapplication of the bias current $I_b$, the gate remains superconducting in the binary zero state at point F. Particular note should be made of the fact that, for this mode of operation, the devices continue to store either a binary one or binary zero when the control conductor current is either zero or equal to the value $I_1$, and that half select type signals may be applied with the gates either in the binary one state at E or the binary zero state at F without disturbing the information state of the device.

A similar mode of operation in which binary ones and zeros remain stored in the gate conductor section in the absence of control conductor current may be achieved for a transmission line carrying a bias current providing a transition curve such as is depicted at 22 in FIG. 2A. This is done by raising the operating temperature $T_0$, and thus, in effect, shifting the rectangular operating characteristic FABCDEF to the right so that operating point E at temperature $T_1$ is to the right of the point at $T_2$ at which curve 22 intersects the abscissa.

It is also possible to operate the transmission line memory device of FIG. 1 in a mode wherein writing in the storage device is also accomplished under the control of signals applied directly to the transmission line. This operation is described with reference to FIGS. 2B and 3B. A binary zero is considered to be stored when a gate is at operating point F in FIG. 2B and is superconducting, and a binary one is considered to be stored when the gate is at operating point E and is resistive. If, with the gate in the binary zero state at F, a signal is applied to the associated write control circuitry of FIG. 3B, for example, to the input transformer 40A to induce a current signal in loop 30A which includes the control conductor 20A, an excursion is produced from the point F to point A and the gate 12A remains superconducting. If, however, with the gate maintained at point A by current flowing in the control conductor 20A a signal is applied at the left-end of the transmission line 10 in FIG. 1, this signal is propagated down the line through the gate conductor 12A and the gate conductor will be driven resistive.

The magnitude of the signal applied to the transmission line is sufficient to be effective when the control conductor 20A is carrying current $I_1$ to drive the gate conductor resistive and to be ineffective in the absence of control conductor current to change the state of the gate. This signal is applied as above described without interrupting the bias current $I_b$ applied by the transmission line. Thus, it can be seen that in this mode of operation, assuming each of the gates 12A through 12F to be in a superconducting state, a signal can be applied to transmission line 10 for a write operation and binary ones are written in each of the gates 12A through 12F, the control conductor which is carrying a current $I_1$ at the time the signal passes through the gate conductor. The actual writing is accomplished by the coincident control of the signals applied to the transmission line and signals applied to the control conductor for the gate. When either signal is applied independently, the state of the gate remains unchanged.

The binary one and binary zero states are at points E and F in FIG. 2B, and binary ones which have been written in the gates in the transmission line are erased by interrupting the bias current $I_b$. The interrogation is carried out as is explained below in detail by applying to the transmission line signals $I_s$ which may be of the same magnitude as the signal employed to control the writing.

The same mode of operation may be also practiced using the gate characteristic shown in FIG. 2A. In such a case, as will be apparent from the detailed description of the readout operation which follows, the signal applied to the transmission line to control writing in the gates necessarily has a larger magnitude than the signal $I_s$ which is subsequently applied to interrogate the binary state of the gates.

It is also possible to accomplish writing of information in the various gate structures of the transmission line under the control of radiant energy signals, either by themselves or in combination with electrical signals applied to the control conductors 20A—20B. In one such mode of operation, means are provided for selectively applying radiant energy, for example, in the form of infrared rays, to the various gating devices. Referring to FIG. 2A and considering the operation wherein the control conductor carries a bias current $I_x$ when the gate is in a quiescent state storing a binary zero at point A, a binary one is written in the gate by applying the radiant energy to heat the gate from temperature $T_0$ to temperature $T_1$. Once the latter temperature is attained, the gate remains stably in the binary one state at point D as long as the bias currents are maintained in the transmission line and the associated control conductor. As before, binary ones may be erased individually by selectively interrupting the current in the associated control conductors, or the entire memory may be erased by interrupting the bias current $I_b$ in the transmission line.

The control conductors may be eliminated entirely and writing accomplished exclusively by radiant energy signals. In such a case, binary zero and binary one states are at points F and E in FIG. 2B, and a binary one is written by applying sufficient radiant energy to the gate to heat it to the temperature $T_1$. The bias current $I_b$ in the transmission line through $I^2R$ heating maintains the gate stably at point E at this temperature after the radiant energy writing signal is terminated. Erasing is accomplished by interrupting the transmission line bias current.

In the discussion of the invention up to this point, the strip conductor 12 of FIG. 1 which, with shield 14, forms the transmission line memory structure 10, has been considered to be fabricated of both hard and soft superconductive sections. However, it is an important feature of the subject invention that this strip may be a homogeneous strip of soft superconductive material. This type of structure is, of course, easier to fabricate and has the advantage of obviating the possibility of noise signals being produced at the junctions between hard and soft superconductive sections in the line. Where a homogeneous soft superconductive strip line structure is utilized, the preferred mode of operation is that explained above with reference to FIG. 2A wherein a bias current is continuously applied to the control conductor when the gate section is in either its binary zero state at A or binary one state at D. When in the latter state, the gate section is resistive and is continuously being heated by the bias current flowing in the transmission line. The portions of the strip 12 adjacent the gate section are subject to the heat produced by the gate sections. However, these adjacent portions are not subject to the bias field produced by current in the control conductor and, even if heated to the temperature $T_1$, remain superconductive at point E. There is, therefore, no danger of resistance spreading along the line from gate section to gate section; and the gate sections which are driven resistive are precisely defined by the bias field supplied by control conductors 20A through 20F.

Figures 4A, 4B:
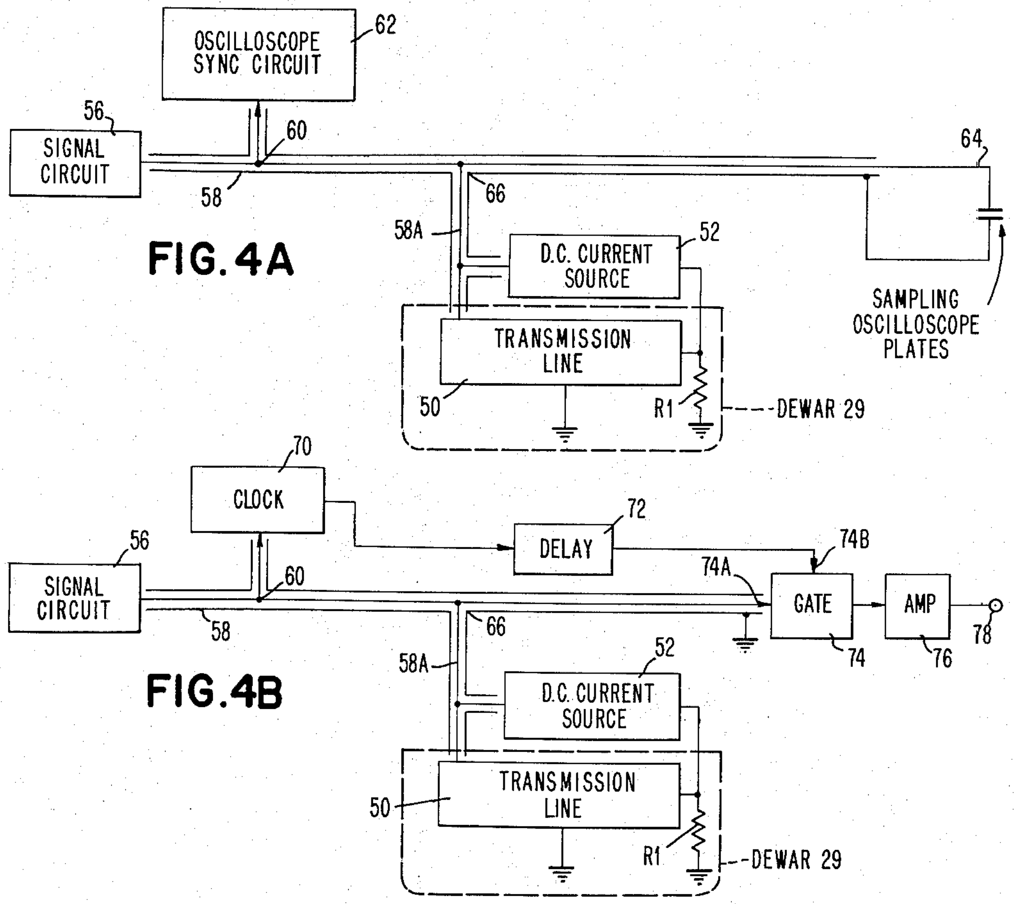
FIGS. 4A and 4B are schematic diagrams illustrating readout circuitry used to interrogate the transmission line memory of FIG. 1.

Two embodiments of the circuitry for reading out the transmission line structure 10 of FIG. 1 are illustrated in FIGS. 4A and 4B. Referring first to FIG. 4A, the transmission line storage device shown in FIG. 1 together with the input circuitry for controlling the writing of information in the storage gates located in the transmission line is represented by the block 50. This block is shown entirely within the dewar 29 maintained at a superconductive temperature and, therefore, is a more accurate representation of the device using the superconducting control circuitry shown in FIG. 3B. When the type of control circuits illustrated in FIG. 3A are used, the portion of the circuit including the switches $S_1$, $S_2$ and $S_3$ is located outside the superconducting environment. The D.C. current which is applied to the transmission line 10 of FIG. 1 is, in FIG. 4A, received from a D.C. current source designated 52, which is connected across the transmission line. The impedance element $R_1$ shown in FIG. 4A represents the characteristic impedance with which the line 10 is terminated at 18 in FIG. 1. Interrogation signals are applied to the the transmission storage device by a signal circuit 56. This circuit applies signals to a coaxial line 58 which is connected at 60 to the sync circuit 62 of an output oscilloscope. The sampling plates for the oscilloscope are connected to the other end of the coaxial line 58 as shown by the block representation 64. A further connection is provided from the line 58 at 66 which connection extends to the input of the memory transmission line structure.

Thus, it van be seen that when a signal is applied by the signal circuit 56 to coaxial line 58, signals are applied during subsequent time intervals to the oscilloscope sync circuit 62, to the transmission line memory 50, and to the sampling plates for the oscilloscope 64. The signal applied to the oscilloscope sync circuit 62 is used to properly time the response of the oscilloscope to provide a readout for the reflections produced by resistive gates in the transmission line. The portion of the pulse applied to line 58 by signal source 56 which is transmitted directly to the sampling plate 64 does not produce any useful output. The portion of the pulse which is at point 66 directed to the transmission line memory of block 50 is applied, as is indicated in FIG. 1, as the signal $I_s$ to transmission line 10. As this signal propagates down the line, it produces a reflection at each one of the gate sections 12A through 12F which is in a resistive state storing a binary one. No reflections are produced at those gates which are in a superconducting state. The design is such that only a small amount of the incident energy of the pulse is reflected and the greater portion of the pulse continues to propagate down the line to the termination 18. With this type of arrangement each reflected signal is of relatively the same magnitude.

Assuming for example, that gates 12A, 12C and 12F are resistive and the other three gates are superconducting, the signal $I_s$ (FIG. 1) applied to the transmission line produces three reflections $I_r$ in a time relationship representative of the gates which are resistive. These reflected signals arrive to the left-hand portion of the line and then proceed up through the portion 58A of the transmission line 58 to the junction at point 66. From this point, these reflected signals are transmitted to the sampling plates of the oscilloscope 64. As mentioned above, a timing pulse was produced for controlling the operation of the oscilloscope in response to that portion of the original input pulse which is applied to the oscilloscope sync circuits represented by block 62. Therefore, the reflected pulses representing the binary ones in gates 12A, 12C and 12 F are reproduced in a predetermined arrangement on the oscilloscope screen and with the position of the pulses indicated just which ones of the gates produced the reflections. A continuous pattern representative of the gates which are resistive may be obtained by repeatedly applying signals from the signal circuit 56 to regenerate the pattern and make it continuously visible.

Particular note should be made of the fact that, in the embodiment of FIG. 4A, the interrogation signal is applied by circuit 56 which is outside the helium environment to produce an electrical manifestation of the storage state of the gates in the transmission line on the oscilloscope which is also outside the helium environment. This illustrates the utility of the subject invention in data processing apparatus wherein only the memory itself is to be located within the helium environment and the remaining portions of the system are located outside the environment and are fabricated of more conventional components.

The embodiment of FIG. 4B is similar in many respects to that of FIG. 4A and for this reason, like reference characters are used in both figures to designate like components. In this embodiment FIG. 4B, the signals from the signal 56 are applied at junction 60 to a clock pulse source 70, at junction 66 to the transmission line 50, and at the right-hand end of coaxial 58 to one input 74A of a gating circuit 74. The clock source 70 is effective when it receives a signal from source 56 to produce a series of clock pulses. For the illustrative embodiment of FIG. 1 wherein six gates are connected in the transmission line, clock pulse source 70 produces a pattern of six consecutive pulse. These pulses are fed to a delay line 72 which delays the signals sufficiently so that they are applied to a second input 74B of the gate 74 to be coincident in time with pulses applied to the other input of this gate in response to reflections produced by those gates 12A through 12F in transmission line 10 which are in a resistive state. It should be noted that the portion of the signals applied by source 56 which is fed straight down the line to input 74A of gate 74 does not pass this gate since, at this time, there is no signal transmitted from the clock 70 to the input 74A of gate 74. However, at the time each of the reflections $I_r$, produced by a resistive gate in the transmission line, reaches input 74A of gating circuit 74, a clock pulse is present at the other input 74B of this gate. Therefore, the reflected signals representative of binary ones are passed through the gate and applied to an amplifier represented by the block 76. The amplified pulses, indicative of the information stored in the transmission line structure, are then produced at the terminal 78. If, for example, each of the gates in the transmission line is in a resistive state, six pulses are produced at terminal 78. If it is desired to transpose the serial output information produced at terminal 78 to a parallel type output manifestation, it is only necessary to feed this information into a conventional serial to parallel converter.

Though in the embodiment of FIG. 4B the coaxial line 58, the clock 70, delay line 72, gate 74 and amplifier 76, are shown to be outside the superconductive environment, this is not absolutely essential for the operation of the invention. Superconductive components may be used to perform the required functions in order to realize an output within the superconductive environment which can be used to control other superconductive circuits.

It should also be pointed out that both writing and erasing may be controlled by signals applied to both ends of the transmission line memory structure. By applying the signals in proper time relationship, they can be controlled to pass through any one of the gate sections at the same time. Signals applied to both ends of the line having a polarity to add to the field provided by the bias current can be used to selectively control writing in any gate section, and signals of opposite polarity to selectively control the erasing of information in any gate section.

In order to fully understand the limiting parameters for operating the embodiments of FIG. 4A and 4B to produce readout reflections without disturbing the information stored in the transmission line, reference should again be made to FIGS. 2A and 2B. When the storage device is operated in a mode such that, when in a quiescent storage state, the control conductor is carrying a current $I_1$ in FIG. 2A, and the storage states are at points A and D, care must then be taken in applying the interrogation signals $I_s$ to the gates in the superconducting state at A that these signals do not have sufficient magnitude to drive the gates from a superconducting to a resistive state. No problem is presented by the resistive gate storing a binary one at point D when the interrogation signals $I_s$ are applied. In the embodiment of FIG. 2B where the control conductors carry zero current when the device is in its quiescent storage states exist at points F and E, the interrogation signals may be somewhat larger without driving the superconducting binary zero representing gates in the line into a normal state.

In choosing the value of the signals $I_s$ which are to be applied to the line, as large a value as can be employed without driving the superconducting gates resistive is preferred, since the larger the applied signals, the larger the reflections produced at the resistive gates. In order that each of the reflected signals have about the same magnitude, the gates are designed to have a resistance so related to the characteristic impedance of the transmission line that less than 3% and preferably only 1% of the energy of the incident signal is reflected at each resistive gate, the remaining 99% of the energy of the incident signal continuing on to the next gate. This mode of operation allows a number of gates in one transmission line to be interrogated in a single operation, and though the outputs realized are limited in magnitude, they are distinguishable with relatively conventional circuitry. Further, since the relative magnitude of reflected to incident signals is so low, no noise problem is presented by multiple reflections between resistive gates. Output signals in the order of 3 microvolts may be attained for applied interrogation signals $I_s$ in the order of 0.3 volt. Further, such output signals representative of the information stored in the entire line are obtained in times less than 100 millimicroseconds. It is, of course, obvious that more than six storage gates may be connected in a single line, though the number of gates in a single line is, of course, limited by the fact that, at each resistive gate, there is some loss of energy from the interrogation signals $I_s$.

More specifically, a transmission line memory containing twenty-five gates may be fabricated to have an overall length of less than 30 inches with a spacing of approximately 1.5 cm. between gates. In such a case, substrate space may be advantageously used by laying down the transmission line in serpentine fashion. For such a line, the time required for readout of all of the information stored in the storage device gates connected in the line is in the vicinity of 80 millimicroseconds for a typically constructed superconductive transmission line. For more details on the specifics of the structure and speed of propagation on superconductive transmission lines and the manner in which such lines are fabricated to provide different transmission speeds, reference should be made to copending application Serial No. 16,431 filed in behalf of D. R. Young et al. on March 21, 1960.

It should also be understood that, though in the embodiments of the invention here illustrated, crossed film cryotrons are employed, that is cryotrons whose gate and control elements are arranged at right angles to each other, in-line cryotrons having parallel control and gate elements may be also employed as in many applications of the inventive principle. Such cryotrons may be employed not only to store the information in the transmission line 10, but also as a means of reading out information stored in the line using principles similar to those disclosed in copending application Serial No. 79,824, filed in behalf of J. L. Anderson, December 30, 1960.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A superconductive circuit comprising a superconductive transmission line; first, second and third superconductive gate conductors connected in said transmission line; each of said gate conductors being capable of being switched between superconducting and resistive states; means applying a biasing current to said transmission line; means for controlling said gate conductors to switch from a superconducting to a resistive state including first, second and third control conductors each arranged adjacent a corresponding one of said gate conductors; each of said control conductors having a quiescent current condition and an energized current condition each effective when in its quiescent current condition to change the state of the corresponding gate conductor; means for applying and removing signals to each of said control conductors selectively to cause said control conductor to assume its energized current condition and thereby control the switching of the corresponding gate conductor from a superconducting to a resistive state; each said gate conductor when switched into a resistive state being retained in said resistive state by the bias current applied to said transmission line when the signal applied to the corresponding control conductor is removed to return the control conductor to its quiescent current condition; means for interrogating the state of each of said gate conductors in said transmisison line comprising means for applying an interrogation signal to said transmission line; said interrogation signal when incident upon each of said gate conductors in said transmission line which is in a resistive state producing a reflection in said transmission lne; and means responsive to each of said reflected signals for providing an output indicative of the information state of each of said gate conductors.

2. The circuit of claim 1 wherein each of said control conductors is carrying essentially zero current when in its quiescent current condition.

3. The circuit of claim 1 wherein the current in each of said control conductors when in its quiescent current condition is a significant portion of the current in the control conductor when it is in its energized current condition.

4. The circuit of claim 3 wherein the current in each of said control conductors when in said quiecent current condition is essentially equal to one half the current in the control conductor when it is in its energized current condition.

5. The circuit of claim 1 wherein each of said control conductors is not effective of and by itself when in its energized current condition to switch the corresponding gate conductor carrying said bias current applied to said transmission line from a superconducting to a resistive state; and said means for controlling said gate conductors between superconducting and resistive states includes means for applying a signal to said transmission line of a magnitude such as to be ineffective in the presence of the bias current to switch each of said gate conductors resistive when the corresponding control conductor in its quiescent current condition but effective in the presence of the bias current to switch each of said gate conductors resistive when the corresponding control conductor is in its energized current condition.

6. The circuit of claim 1 wherein each said interrogation signal applied to said transmission line when incident upon one of said gate conductors which is in a resistive state produces a reflection having a magnitude of about 1% the magnitude of the interrogation signal; whereby reflection signals of similar magnitude are produced by each of said gate conductors when in a resistive state.

7. A superconductive circuit comprising a superconductive transmission line; means for applying a biasing current to said transmission line; means for storing information in said line including means for introducing resistance into a plurality of selected sections of said transmission line; said bias current maintaining said selected sections in a resistive state after the introduction of resistance therein; and means for applying an interrogation signal to said transmission line with said bias current being continuously applied to produce a plurality of output reflections in said line, one at each of said resistive sections; and means responsive to said reflections for providing outputs indicative of information represented by said resistive sections.

8. The circuit of claim 7 wherein there are at least three sections in said transmission line into which resistance is introduced and the resistance of each of said sections is so related to the characteristic impedance of said transmission line such that when said interrogation signal is incident thereon the reflection produced has a magnitude of about 1% of the incident interrogation signal; whereby the reflection from each of said resistive sections is essentially of the same magnitude.

9. The circuit of claim 7 wherein said selected sections of said transmission line into which resistance is introduced are part of a single homogeneous strip of superconductive material.

10. A superconductive circuit comprising a superconductive transmission line, means for storing information in said transmission line including means for selectively introducing resistance into a plurality of gate sections of said transmission line, means for applying to said transmission line an interrogation signal which propagates through said resistive sections in sequence to produce a series of reflections in said line representative of the information stored therein, output means coupled to said transmission line and responsive to said series of reflections for producing outputs indicative of the information stored in said transmission line, the resistance of each of said gate sections being such that the reflections in said series to which said output means responds have similar magnitudes, and means for applying a bias current to said transmission line to maintain resistive those sections of said line to which resistance is introduced, said interrogation signal being applied to said line without interrupting said bias current.

11. A superconductive circuit comprising a superconductive shield; a homogeneous superconductive strip adjacent said shield and forming therewith a superconductive transmission line; said superconductive strip including a plurality of gate sections each capable of being switched between superconducting and resistive states; a plurality of control conductors each arranged adjacent a corresponding one of said gate sections; and means for storing of information in said line and for interrogating said line to determine the information stored therein comprising; first means for applying a D.C. bias current to said line; second means for applying signals to said control conductors; third means for applying to said line, in the presence of said bias current, signals which propagate through said gate sections in said line in sequence; and fourth means responsive to reflections produced in said line when said signals propagate through a gate section in a resistive state.

12. The circuit of claim 11 wherein said gate sections have a resistance small compared to characteristic impedance of said line whereby less than 3% of the energy in a signal propagating in said line is reflected when it propagates through one of said gate sections in said line in a resistive state.

13. The circuit of claim 11 wherein said information is stored in said line by selectively driving said gate sections resistive under the control of signals applied to said line by said second means and signals applied to said control conductors by said third means; and the information stored in said line is interrogated by signals applied to said line by said second means to produce reflections in said line at the resistive gate sections to which said fourth means respond.

14. The circuit of claim 11 wherein information is stored in said line by selectively driving said gate sections resistive under control of signals applied by said third means to said control conductors; and information stored in said ilne is interrogated under the control of signals applied to said line by said second means to produce reflections in said line as said resistive gate sections to which said fourth means respond.

15. A superconducting circuit comprising a superconducting transmission line; said superconductive transmission line including a plurality of gate sections each capable of being switched between superconducting and resistive states; means for storing information in said transmission line including means for selectively introducing resistance into selected gate sections in said transmission line; means for applying a biasing current to said transmission line for maintaining resistive those selected gate sections into which resistance is introduced; means for applying to said transmission line an interrogation signal which propagates through said resistive gate sections in sequence to produce a series of reflections in said line representative of the information stored therein; the resistance of each of said gate sections being small compared to the characteristic impedance of said line whereby less than 3% of the energy of the incident interrogation signal is reflected by each resistive gate section; and output means including means coupled to said line for producing an output signal in response to each of said reflections in said series and means for producing synchronizing signals to gate the signals produced in response to said reflections in said series.

References Cited in the file of this patent

UNITED STATES PATENTS

| | | |
|---|---|---|
| 2,926,217 | Powell | Feb. 23, 1960 |
| 2,962,681 | Lentz | Nov. 29, 1960 |
| 3,003,143 | Beurrier | Oct. 3, 1961 |